April 2, 1957 C. G. MUEHLFELD 2,787,697
CHICK BROODER
Filed June 15, 1951 3 Sheets-Sheet 1

INVENTOR.
Clarence G. Muehlfeld.
BY
Frank C. Fearman.
ATTORNEY

April 2, 1957

C. G. MUEHLFELD 2,787,697

CHICK BROODER

Filed June 15, 1951

INVENTOR.
Clarence G. Muelfeld.
BY
Frank C. Kartman.
ATTORNEY

April 2, 1957 C. G. MUEHLFELD 2,787,697
CHICK BROODER
Filed June 15, 1951 3 Sheets-Sheet 3
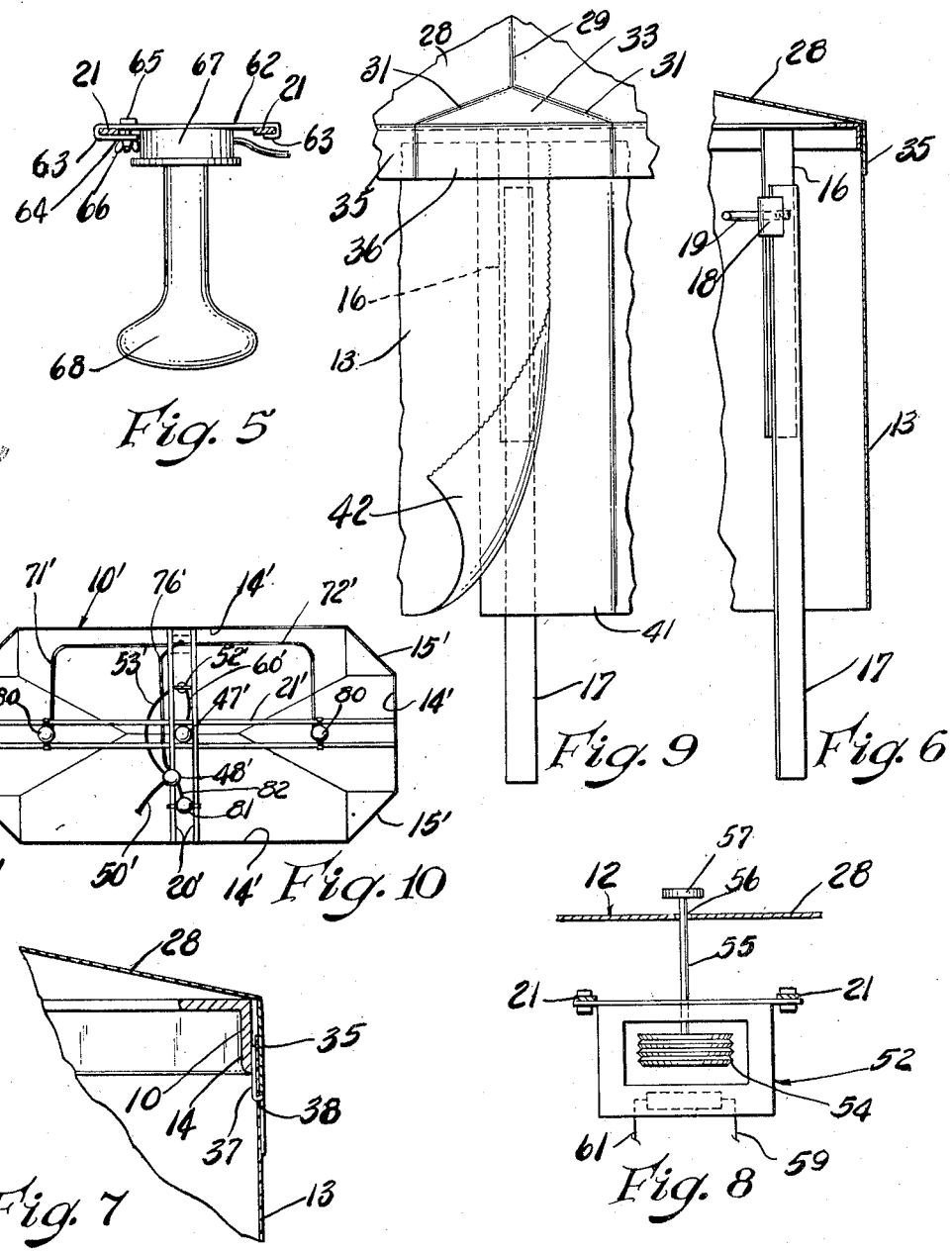
INVENTOR.
Clarence G. Muehlfeld.
BY
Frank C. Fearman,
ATTORNEY

United States Patent Office 2,787,697
Patented Apr. 2, 1957

2,787,697

CHICK BROODER

Clarence G. Muehlfeld, Bridgeport, Mich.

Application June 15, 1951, Serial No. 231,750

14 Claims. (Cl. 219—35)

The present invention relates to chick brooders, and more particularly to a brooder in which the temperature is maintained substantially constant by means of thermostatically controlled radiant energy infra-red rays from electric lamps emitting relatively short wave length rays.

One object of the invention is to provide a chick brooder in which the radiant heat energy can be controlled by moving the electric heating lamps radially inwardly and outwardly so that the same can be adjusted to different positions and on various radii from the center of the brooder.

Another object is to provide a chick brooder which is adapted to accommodate a large number of chicks at one time, which is accomplished by adjusting the height of the brooder and also adjusting the radiant energy heating units radially outward as the chicks increase in size from their normal growth after their incubation period.

Another object is to provide a chick brooder having a central radiant energy heating unit, together with a plurality of adjustable radiant energy heating units, certain of which can be manually adjusted on different radii from the center unit and selectively connected and disconnected from a source of electrical energy, to thereby vary the temperature of the brooder by decreasing the number of units in operation as the chicks grow older and generate more body heat, thus permitting a smaller number of radiant heat units to be used with a consequent saving in the consumption of electrical energy.

Another object is to provide a chick brooder having a frame structure supported on quickly adjustable legs to permit the canopy, frame structure and heating units to be raised or lowered with reference to the floor or other surface upon which the brooder is supported. Thus, the heating units and canopy may be raised with reference to the floor surface as the chicks grow older and generate more body heat, with the added result that the heat from the heating units is evenly distributed over a larger area.

Another object is to provide a chicken brooder employing radiant energy heating units of the type which emit heat rays of relatively short wave length such as infra-red rays and the like having health giving characteristics, thus producing healthier and stronger chicks and minimizing the loss of chicks.

Another object is to provide a chick brooder which is capable of being knocked down and quickly assembled to facilitate ease in shipping and convenience in handling.

Another object is to provide a chick brooder in which certain of said adjustable radiant heat energy units can be quickly and manually disconnected while still others are automatically controlled by the room temperature in which the brooder is located, the center unit being controlled automatically and independently by means of a thermostat located in the brooder, this arrangement permitting the regulation of the heat in the brooder to suit the changes in temperatures and growth of the chicks.

Another object is to provide a chick brooder having a plurality of adjustable radiant heating units adapted to be moved radially inward and outward toward a fixed central heating unit, and to provide an independent thermostatic control for said central heating unit located internally of the brooder, and in addition to provide a thermostatic control located outside the brooder for controlling certain of said radiant energy heating units as the room temperature changes.

A further object still is to provide a chick brooder with heat units so spaced and controlled that the floor area of the brooder will be divided into zones of different temperatures as not all chicks require the same temperature, the weaker chicks requiring higher temperature, congregating in the high temperature zone, while the stronger chicks move into a lower temperature zone. This eliminates the strong crowding the weak, reduces the mortality and brings the weaker chicks along much faster than is possible in the conventional brooder where there is but a single temperature zone.

Still a further object is to design a chick brooder having quickly adjustable legs by means of which the entire brooder, including curtains, can be raised, so that the lower edge of the curtains are always above the chicks' heads, thus insuring that the chicks will have fresh air at all times, the foul air escaping below the curtains and above the heads of the chicks and further keeping the litter dry at all times.

Other objects and advantages of the invention will become apparent during the course of the following description of the accompanying drawings wherein:

Figure 5 is an enlarged side elevational view of one of the infra-red ray heating units showing the manner in which its socket housing is supported on the frame.

Figure 6 is an enlarged fragmentary sectional view through one of the corner portions of the brooder, illustrating one of the adjustable legs and the manner in which it is clampingly and adjustably held in place.

Figure 7 is a fragmentary, sectional elevational view through the frame structure and hood illustrating the manner of detachably connecting the flexible plastic skirt or apron.

Figure 8 is a vertical cross-sectional view greatly enlarged and taken on the oblique line 8—8 of Figure 2 and looking in the direction of the arrows to illustrate the brooder thermostat and its manual control projecting through the canopy or roof structure.

Figure 9 is an enlarged, fragmentary corner elevational view showing the manner in which the ends of the flexible plastic curtains are overlapped at the corners of the brooder, and Figure 10 is a bottom or inverted plan view of a modified form of the invention showing a brooder of rectangular shape and a frame structure mounting three radiant energy infra-red ray heating units.

Figure 2:
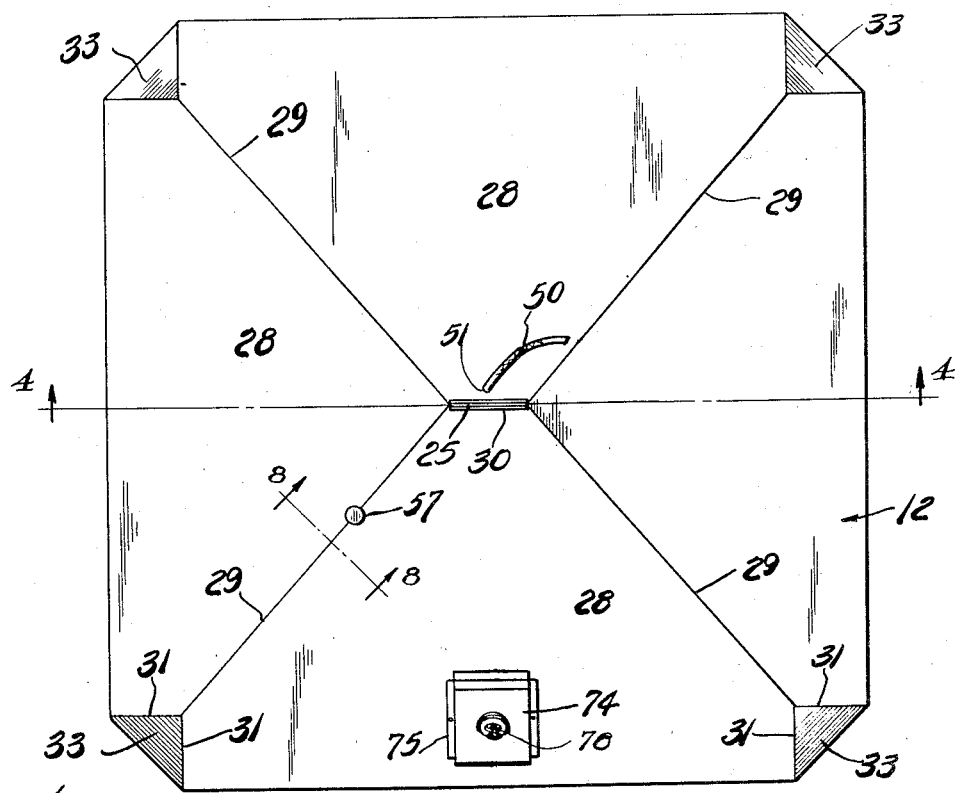
Figure 2 is a top elevational view of the brooder showing the oblique corner edges, and the manner in which the external room thermostat is mounted on the canopy.
Figure 1:
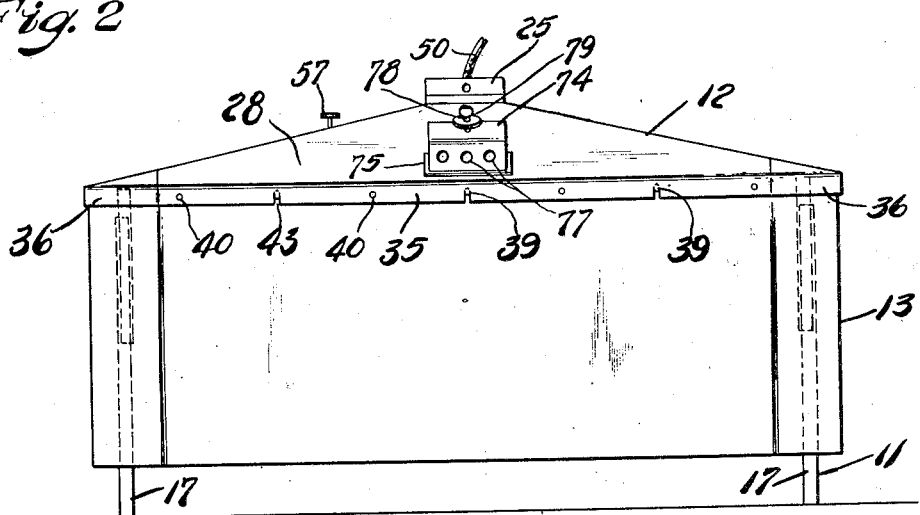
Figure 1 is a side elevational view of the brooder showing the flexible skirt or aprons depending from the frame.

In the drawings, and more in detail, attention is first directed to Figures 1 to 9 wherein there is shown for the purpose of convenience of illustration a preferred embodiment of the invention, including a closed frame structure generally designated 10 supported on legs, likewise generally designated 11 and located adjacent the corners of the frame structure 10. The brooder also includes a canopy or roof structure generally designated 12 and aprons or curtains generally designated 13 removably supported by the frame and canopy as will be hereinafter described.

Figure 3:
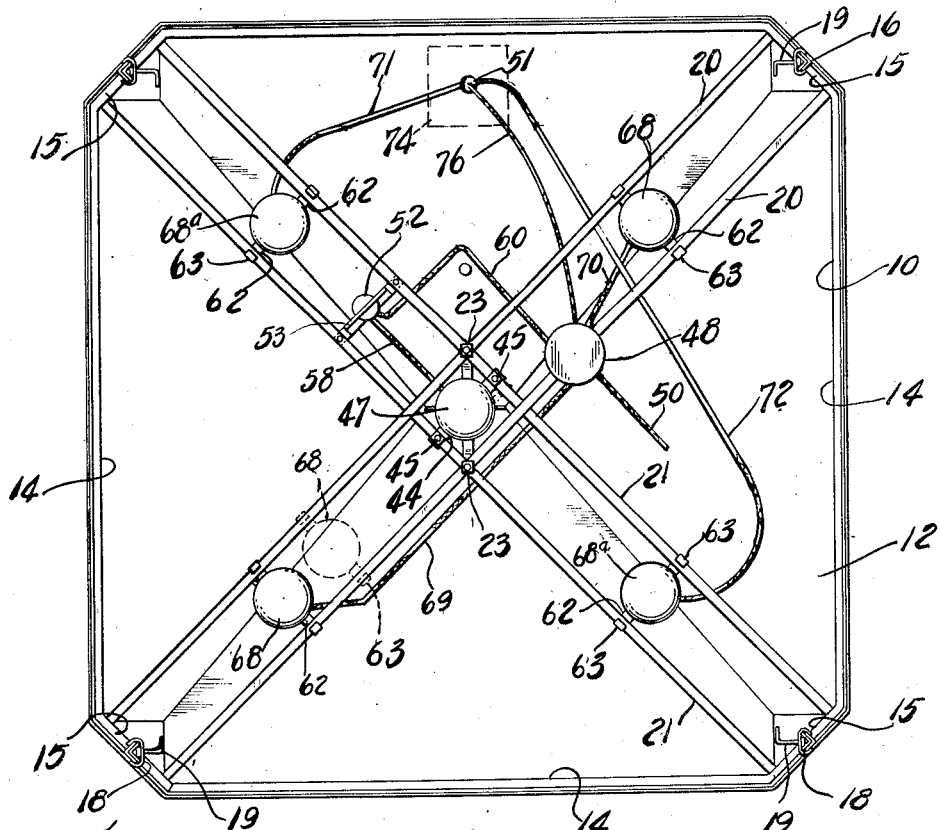
Figure 3 is an inverted plan view of the brooder showing the manner in which the infra-red radiant energy heating units are supported on the frame structure, with the central-most unit fixed and the remaining units arranged to be manually adjusted to various positions as indicated by the broken lines.

As illustrated in Figure 3, the frame structure 10 includes side rails 14 of angle section having oblique connecting corner frame members 15 which have their ends welded or otherwise secured to adjacent ends of the side rails 14. The square or closed frame structure 10 is provided on the corner rails or oblique sections 15 with relatively short depending legs 16, which have their upper ends welded to the bars 15, and their lower ends provided with adjustable leg sections 17. The short leg sections 16 and attenuated leg sections 17 are formed of angle bars which are inter-fitted and are adapted to be held in place by a clamping plate 18 which has its ends welded to the flange edges of the attenuated leg sections 17 in such a manner as to encircle or embrace the flanges of the upper leg section 16. Each of the clamping plates 18 is provided with a threaded opening (not shown) for receiving the correspondingly threaded end of a clamping screw 19, which is so mounted that its inner end will engage the external corner edge of the upper leg section 16 and thereby securely clamp the attenuated lower leg section 17 in an adjusted position.

Extending diagonally of the frame structure 10 is a pair of supporting frames comprising spaced bars 20 and 21 forming tracks arranged in criss-cross fashion in the frame with the ends of the bars 20 welded or otherwise secured to opposite diagonal corner bars 15, and the ends of the spaced bars 21 similarly welded or otherwise secured to the opposite set of diagonal corner bars 15. The centralmost portions of each set of bars 20—21 may be secured together at the points of intersection to reinforce and add rigidity to the structure. The bars 20 provide tracks or courses which extend outwardly from the points of intersection toward the edges of the canopy 12 and it will be noted that the bars 21 provide other tracks or courses which similarly extend outwardly from the points of intersection toward the edges of the canopy 12 but at an angle relative to the tracks formed by the bars 20.

Extending upwardly from opposed intersecting portions of the diagonal frame bars 20—21 is a pair of arms 23 which have their lower ends secured in place by welding or the like, and their upper ends connected as at 24 to a suspension plate 25 having an opening 26 for receiving a cable or the like (not shown) which may be passed over a pulley of a tackle to enable the brooder to be lifted bodily from the floor surface F upon which it is supported.

The canopy structure 12 is formed of light metal and is pyramidal in shape, being formed of triangular sections 28, welded or otherwise secured along their ridges as at 29. A central opening 30 is formed between the upper ends or apices of a pair of opposite triangular canopy sections 28 for the passage of the supporting plate 25. The corners of the canopy 12 are cut away as at 31 to receive triangular corner members 33 which are shaped to conform to the diagonal frame bars 15 connecting the ends of the side frame bars 14. Thus, sharp corners are eliminated in the canopy structure 12 as well as the frame structure 10, and permits the flexible curtains 13 to be more conveniently applied and overlapped.

Formed on the lowermost edges of the triangular sectors 28 is a downwardly depending flange 35, and similarly corner flanges 36 are formed on the triangular sections 33 which connect the ends of the depending flanges 35. The depending flanges 35 and 36 are adapted to overlie the side rails 14 and corner rails 15 of the frame structure 10. As indicated in Figure 7 the angle bars 14 forming the side rail members are arranged with one leg arranged horizontally and the other leg extending downwardly in parallel relation with the depending flanges 35, and tabs 37 are formed in the lower edge of the flanges 35, these tabs being bent inwardly and inserted through suitable openings 38 provided in the curtains 13, thence the free ends are bent upwardly and bolts 40 extend through the flange 35 and the angles 14 to clamp the upper edges of the curtains and the tabs between said flange and the frame.

The curtains 13 may be formed of synthetic resin plastic, or a flexible fabric formed of cellulose or synthetic resin threads woven in the usual manner, and I wish to direct particular attention to the fact that the ends 41 and 42 of the respective curtains are arranged in neat overlapping relation at the corners of the frame; there is no puckering or gaps and the upper edges of the curtains are frictionally and clampingly held.

Rigidly connected to the diagonal frame bars 21—21 and extending therebetween is a bracket arm 44 which has its ends return bent as at 45 for receiving the pair of spaced diagonal bars 21—21. Secured to the bracket arm 44 is the socket 46 of a radiant heat energy tube 47 which is of the so-called heating lamp type manufactured by present-day producers of electric lamps of the infra-red ray type. Such lamps range from 75 to 250 watts power consumption, and are operable when the filament is brought to a point of incandescence when connected to a domestic 110 volt supply source.

The base or threaded connector of the infra-red ray lamp 47 is of conventional design (not shown) for being received in the lamp socket fitting 46 and the socket is provided with an internally threaded opening for receiving the correspondingly threaded base of the infra-red ray lamp 47.

Mounted on one pair of the diagonal frame bars 20—20 is a junction box 48 which is supplied with electrical energy by cable 50 which leads through an opening 51 provided in the canopy 12 and is connected to any suitable source of electrical energy (not shown).

A temperature responsive switch 52 is also mounted on a bracket 53 provided on the bars 21—21, said switch including an expansible bellows 54 mounted on the lower end of a vertical rod 55 which projects through an opening 56 provided in the canopy 12, a knob 57 being provided on the upper end of the rod to facilitate manual adjustment thereof, so that the mechanism may be set to provide the desired temperature.

A cable 58 is connected to one of the leads 59 of the switch 52, thence being connected to the terminals (not shown) of the socket 46, a similar cable 60 being connected to the terminal 61 of the switch 52, thence leading to and being connected to the terminals (not shown) of the junction box 48 in the usual manner, and it will be obvious that this center lamp 47 is controlled by the temperature responsive switch 52 located within the brooder.

Mounted on the diagonal bars 21 of the main frame are bracket arms 62 which have their ends hooked over said pairs of bars 21—21, said arms being return bent as at 63 around the undersides thereof. One of the bracket arms 62 is shown in Figure 5, and as all of the bracket arms are identical in construction, a description of but one will suffice for all. These bracket arms 62 are formed of flat thin strips of metal, one of the hooked and return bent ends 63 being formed slightly longer than the other as at 64 and is provided with an opening for receiving the end of a bolt 65 which is passed through the strap portion of the arms 62 and extends through the opening in the end of the return bent portion 63. A wing nut 66 is threaded on the bolt 65 to releasably secure the bracket arm in adjusted position.

Sockets 67 are supported by these bracket arms 62 provided on the bars 20—20 and radiant lamps 68—68 are threaded thereinto, cables 69 and 70 leading from the lamps 68 to the junction box 48 to supply electrical energy. The center radiant energy lamp 47 is controlled by the thermostatic switch 52, while the lamps 68—68 can be disconnected from their sockets and low wattage bulbs substituted for same after the chicks have passed a predetermined point in their growth and less heat is required, the low wattage bulbs furnishing constant light.

The lamps 68—68 are manually adjustable with relation to the center lamp 47; it is merely necessary to slide the bracket arm 62 on the bars 20—20 and the lamps can be easily and conveniently adjusted to different points of radii. As the chicks increase in size, through normal growth, the bracket arms 62 and lamps 68 are moved outwardly and radially from the center infra-red ray lamp 47, thus providing increased heating area and individual temperature zones throughout the entire brooder area, with the result that as the chicks grow, the temperature can be easily controlled, and when less heat is required, the lamps 68 can be replaced with low wattage light bulbs as previously stated.

Radiant heat energy tubes 68ª—68ª are mounted in similar sockets provided on bracket arms 62 which are secured on the diagonal frame bars 21—21, and cables 71 and 72 (not shown) located in a switch housing 74 mounted on an insulated strip 75 provided on the roof of the canopy in any desired manner, a cable 76 leading from said switch to the junction box 48 in the usual manner. This switch is controlled by room temperature and is therefore located exteriorly of the brooder, the switch housing being perforated as at 77 and an adjusting stem 78 projects from said housing and is provided with a knob 79 on the upper end thereof to facilitate adjustment of the switch; and I wish to direct particular attention to the fact that these lamps 68ª—68ª are controlled by the room temperature in which the brooder is located, and not by the temperature in the brooder proper, this arrangement effecting a considerable saving in electrical energy consumed.

As the chicks increase in size, the canopy is raised, and the infra-red ray lamps 68—68 are adjusted radially outwardly and after the chicks have passed a predetermined point in their growth, one or more of the infra-red ray lamps 68 may be replaced with low wattage light bulbs, thus leaving the thermostatically controlled central infra-red ray lamp 47 and the two remaining heating lamps 68ª controlled by the room thermostat to regulate and supply the heat necessary for automatically maintaining the internal temperature of the brooder constant.

In the modified form of the invention shown in Figure 10, a rectangular frame structure has side frame bars 14' and end frame bars 14" connected by corner frame bars 15' extending obliquely as before. The canopy structure 12' is constructed similar to that shown in Figures 1 to 9 inclusive, and the frame structure generally designated 10 is supported on adjustable legs similar to the adjustable leg sections 16 and 17 of the legs 11, likewise shown in Figures 1 to 9 inclusive.

Figure 4:
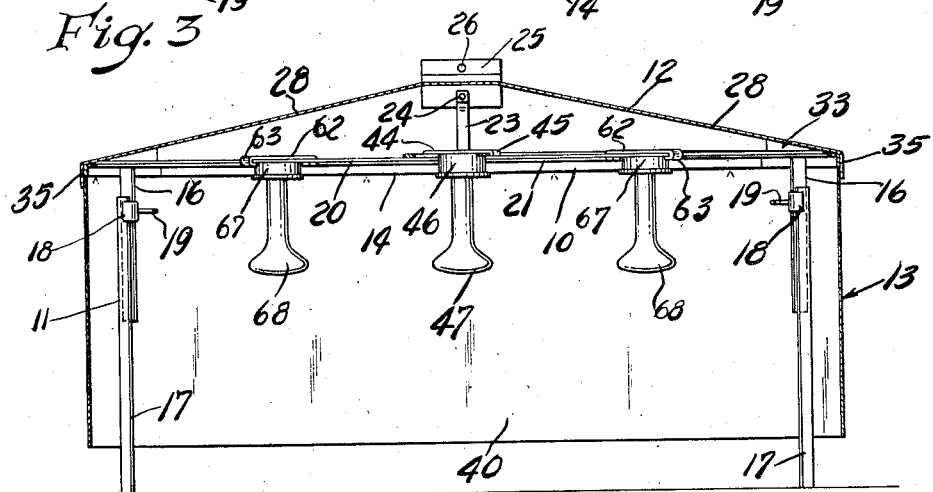
Figure 4 is a vertical, cross-sectional view taken on line 4—4 of Figure 2 looking in the direction of the arrows, and illustrating the manner in which the infra-red heating units are suspended and supported by the frame structure.

Extending between the side frame bars 14' is a pair of spaced parallel transverse bars 20', and similarly extending between the end frame bars 14" is a pair of longitudinal parallel spaced frame bars 21'. Mounted on one of the pair of frame bars 20' is a junction box 48' which is supplied with electrical energy through a supply cable 50' connected to any suitable source of electrical energy. A cable 60' connects the junction box with the temperature responsive switch 52' and a cable 58' connects the temperature responsive switch with an infra-red ray lamp 47'. The other cables 71' and 72' connect lamps 80 with a thermostatically controlled switch (not shown) in exactly the same manner as shown in Figs. 2, 3 and 4, and a cable 76' leads back to junction box 48', the lamps 80 being radially adjustable in the same manner as those shown in Figures 1 to 9 inclusive, and a light 81 is provided in a socket (not shown) on the bars 20' with a conductor 82 leading to the junction box as usual.

In operation of the form of the invention shown in Figure 10, the chicks are placed under the brooder as before, with the infra-red ray lamps 80 adjusted adjacent the central lamp 47', and as before, the radiant energy maintains the brooder at a constant temperature so that the chicks therebeneath on the floor will be kept in a warm condition. As the chicks increase in age and size, and begin to require more floor space, the lamps 80 are moved longitudinally in opposite directions away from the central lamp 47' so that they will distribute the heat over a larger floor area.

When it is desired to raise the brooder from the floor surface in either form of the invention, a tackle pulley and rope (not shown) is attached to the plate 25 so that the hood can be elevated to facilitate cleaning thereof and enable various adjustments to be made to the bracket arms 62 or 62' when adjusting the infra-red ray lamps radially outward along their supporting sets of diagonal and criss-cross bars 20—20 and 21'—21' respectively.

In addition, when the chicks have reached a larger size, the legs 11 may be adjusted to elevate the brooder a greater distance from the floor and consequently raise all of the infra-red ray lamps a corresponding distance, so that the intensity of the heat rays will not be too great but yet will maintain the chicks within the prescribed temperature limits.

It is to be understood that the forms of the invention herewith shown and described are to be taken as preferred embodiments thereof and that various changes may be made in the shape, size and arrangement of parts, without departing from the spirit of the invention or the scope of the subjoined claims.

What I claim is:

1. In a brooder, a frame structure having supporting legs, a canopy for said frame structure to cover the top and sides thereof, a pair of spaced parallel frame bars supported by said frame structure, a radiant energy heating lamp depending from the intermediate portion of said frame bars, a pair of radiant energy heating lamps arranged one on each side of said first-named lamp and adjustably mounted on said parallel frame bars for radial in and out movement toward and away from said first-named lamp to vary the zones of temperature within said brooder, a circuit for said radiant energy heating lamps including a source of electrical energy, and temperature responsive control means in said circuit.

2. In a brooder, a frame structure having adjustable supporting legs, a hood structure covering the top and sides of said frame structure, sets of spaced parallel frame bars arranged in criss-cross fashion with their ends supported by said frame structure, a radiant energy heating lamp depending from the point of intersection of said parallel spaced frame bars, a pair of radiant energy heating lamps mounted on at least one set of said frame bars and arranged to be adjusted radially toward and away from said first-named lamp, a circuit for all of said radiant energy heating lamps including a source of electrical energy, and temperature responsive control means in said circuit for controlling certain of said lamps.

3. In a chick brooder, a frame structure having supporting legs, a canopy for said brooder having a marginal depending flange, curtains wrapped about said frame structure with their upper marginal edges secured to said flange, and their free ends arranged in overlapping relation, sets of parallel spaced frame bars arranged in criss-cross fashion with their ends supported by said frame structure, an infra-red ray lamp mounted at the intersection of said frame bars, lamp supports slidably mounted on said frame bars on opposite sides of said first-named lamp adjustable toward and away therefrom, infra-red ray lamps depending from said supports and movable therewith, and with an electric circuit for said lamps including a source of electrical energy.

4. In a chick brooder, a frame structure having supporting legs, a canopy for said brooder, curtains surrounding said frame structure with their upper edges secured thereto, at least one track bisecting said frame structure, a heating lamp mounted between and depending from the intermediate portion of said track, adjustable supporting arms slidably mounted on said track on each side of said lamp to move radially relative thereto, heating lamps suspended from said adjustable arms, a circuit for all of said lamps including a source of electrical energy, temperature responsive switch means within said canopy connected in said circuit to control the first-mentioned lamp.

5. In a chick brooder, a canopy structure having supporting legs, a radiant energy heating lamp supported centrally in said canopy, perimetrically spaced radiant energy heating lamps mounted outwardly of said first-named lamp, a source of electrical energy for said lamps, temperature responsive switch means within said canopy controlling said central lamp, and temperature responsive means located outside said canopy controlling said perimetrically spaced lamps.

6. In a chick brooder, a frame structure having side frame bars, a canopy for said frame structure extending across the top and sides thereof, sets of parallel spaced frame bars extending diagonally and connected to the corners of said frame structure, an infra-red ray lamp suspended from the point of intersection of said sets of parallel frame bars, an electric circuit for said lamp including a source of electrical energy and a temperature responsive control switch located within said canopy, lamp supports slidably mounted on said parallel frame bars and arranged to be adjusted radially inward and outward with respect to said infra-red ray lamp, infra-red ray lamps depending from each of said supports and movable therewith, a circuit for said last-named lamps including a source of electrical energy, and an external temperature responsive switch in said circuit for controlling certain of said lamps.

7. In a chick brooder, a frame structure having adjustable supporting legs, a canopy supported by said frame and formed with a depending flange, a curtain surrounding said frame structure with its upper edge attached to said depending flange and its ends arranged in overlapping relation, said curtain being formed of flexible plastic material, sets of parallel spaced frame bars extending diagonally with their ends connected to the corners of said frame structure, an infra-red ray lamp supported at the intersection of said frame bars, adjustable lamp supports slidably mounted on said frame bars on opposite sides of said lamp, infra-red ray lamps depending from said supports and movable therewith radially toward and away from said first-named infra-red ray lamp, an electric circuit for said central infra-red ray lamp and the lamps on one of said pair of frame bars including a temperature responsive switch, an electric circuit for the adjustable infra-red ray lamps on the other pair of frame bars, and an external temperature responsive switch for said last-named circuit.

8. In a chick brooder, a rectangular frame structure having supporting legs at the corners thereof, a canopy for said frame structure, parallel spaced frame bars arranged in cruciform fashion extending between the side and end rails of said frame structure, an infra-red ray lamp depending from the central intersecting portions of said spaced parallel frame bars, a circuit for said infra-red ray lamp including a source of electrical energy and a temperature responsive thermostatic switch, lamp socket supports slidably and adjustably mounted on said sets of parallel spaced frame bars arranged to be moved radially toward and away from said central ray lamp, infra-red ray lamps depending from said sockets and movable therewith, a circuit for certain of said lamps including a source of electrical energy and a temperature responsive thermostatic switch, and a circuit for the remaining lamps including a source of electrical energy and including a thermostatic switch mounted externally of said brooder.

9. In a chick brooder, a frame structure, a canopy supported by the frame structure to cover the top and sides thereof, said frame structure including a pair of spaced parallel frame bars, a lamp socket supporting arm extending transversely of said bars with the end portions return bent and hooked therearound to permit longitudinal sliding movement along said frame bars, clamping means for locking and supporting said arm in an adjusted position, a lamp socket secured to said arm and a radiant energy heating lamp mounted in said lamp socket.

10. In a chick brooder, a frame structure having supporting legs, a canopy for said frame structure arranged to cover the top and sides thereof, said frame structure including a pair of longitudinally spaced parallel frame bars, an infra-red ray lamp depending from the centralmost portion of said bars, lamp supporting brackets having their ends return bent and slidably received on said parallel bars for movement toward and away from said central lamp, and infra-red ray lamps suspended from said lamp supporting brackets.

11. The combination defined in claim 4 in which a second track bisects said frame structure in criss-cross relation with said first-mentioned track, supporting arms thereon movable radially from said first-mentioned lamps, heating lamps supported by said last-mentioned arms, and temperature responsive means located outside of said brooder for controlling said last-mentioned lamps in accordance with room temperature.

12. In a chick brooder, a canopy, support means therefor, tracks in said canopy and extending outwardly at an angle relative one to another toward the edges of said canopy from positions spaced inwardly of the edges thereof, and spaced-apart heating elements mounted on said tracks and movable to vary the temperature zones within said brooder.

13. In a chick brooder, a roof, support means therefor, heating member support means within said roof including elements forming generally linearly extending courses extending outwardly at an angle relative one to another toward the edges of said roof from positions spaced inwardly of the edges thereof, and spaced apart heating members mounted on said elements and movable to different positions along said courses to vary the temperature zones within said brooder.

14. In a chick brooder, a roof, support means therefor, heating member support means within said roof including a first means functioning as a track to provide a first course extending outwardly toward the edge of said roof from a position spaced inward thereof, a second means functioning as a track to provide a second course extending outwardly at an angle relative to said first course from a position inward of an edge of the roof toward the edge thereof, and spaced apart heating elements mounted on said first and second means and movable to different positions along said courses to vary the temperature zones within said brooder.

References Cited in the file of this patent

UNITED STATES PATENTS

| 507,364 | Hiler | Oct. 24, 1893 |
| 985,983 | Curtis | Nov. 7, 1911 |
| 1,186,024 | Mulvany | June 6, 1916 |
| 1,450,022 | Doyle | Mar. 27, 1923 |
| 1,457,485 | Ayres | June 5, 1923 |
| 1,530,089 | Perlman | Mar. 17, 1925 |

(Other references on following page)

UNITED STATES PATENTS

| | | |
|---|---|---|
| 1,667,775 | Edmands | May 1, 1928 |
| 1,764,777 | Broughton | June 17, 1930 |
| 1,813,863 | Nightingale | July 7, 1931 |
| 2,287,635 | Nolte | June 23, 1942 |
| 2,340,354 | Wells | Feb. 1, 1944 |
| 2,358,081 | Marick | Sept. 12, 1944 |
| 2,492,258 | Berg | Dec. 27, 1949 |
| 2,493,589 | McCaskell | Jan. 3, 1950 |
| 2,542,699 | Oliver | Feb. 20, 1951 |
| 2,546,536 | Berg | Mar. 27, 1951 |
| 2,603,738 | Schubert et al. | July 15, 1952 |
| 2,610,285 | Rusnak et al. | Sept. 9, 1952 |
| 2,612,594 | Schubert et al. | Sept. 30, 1952 |
| 2,619,577 | Jordan | Nov. 25, 1952 |